(12) United States Patent
Ikeda et al.

(10) Patent No.: US 7,080,106 B2
(45) Date of Patent: Jul. 18, 2006

(54) RANDOM NUMBER GENERATING METHOD AND RANDOM NUMBER GENERATING DEVICE

(75) Inventors: Jun Ikeda, Tokyo (JP); Akira Yukawa, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 677 days.

(21) Appl. No.: 10/234,337

(22) Filed: Sep. 5, 2002

(65) Prior Publication Data
US 2003/0050943 A1    Mar. 13, 2003

(30) Foreign Application Priority Data
Sep. 7, 2001    (JP) .............................. 2001-272538

(51) Int. Cl.
*G06F 1/02*    (2006.01)

(52) U.S. Cl. ...................................... 708/250; 708/255

(58) Field of Classification Search ................ 708/250, 708/255; 327/164
See application file for complete search history.

(56) References Cited

U.S. PATENT DOCUMENTS

| | | | |
|---|---|---|---|
| 2,539,014 A | | 1/1951 | Frantz |
| 3,763,380 A | * | 10/1973 | Homer et al. .................. 327/37 |
| 6,046,616 A | * | 4/2000 | Chan et al. .................. 327/164 |
| 6,542,014 B1 | * | 4/2003 | Saito .......................... 327/164 |

FOREIGN PATENT DOCUMENTS

| | | |
|---|---|---|
| EP | 0 388 131 A2 | 9/1990 |
| EP | 1 241 565 A1 | 9/2002 |
| JP | 2001-134422 A | 5/2001 |

\* cited by examiner

*Primary Examiner*—Chuong D. Ngo
(74) *Attorney, Agent, or Firm*—Sughrue Mion, PLLC

(57) ABSTRACT

A random number generating method and a random number generating device are provided which are capable of generating uniform random numbers. Random pulses are generated by comparing a voltage level obtained by amplifying a voltage level of a thermal noise produced by a thermal noise generating device with a reference voltage level. A pulse controller, if time intervals among random pulses are within a predetermined time, excludes random pulses occurred within the predetermined time and if time intervals among random pulses exceed the predetermined time, random numbers are generated based on time intervals among pulses measured by a counter.

15 Claims, 9 Drawing Sheets

RANDOM NUMBER GENERATING METHOD AND RANDOM NUMBER GENERATING DEVICE

BACKGROUND OF THE INVENTION

1. Field of the Invention

The present invention relates to a random number generating method and a random number generating device, and more particularly to a method and a device for generating natural random numbers or physical random numbers based on a thermal noise fed from a thermal noise generating source.

The present application claims priority of Japanese Patent Application No.2001-272538 filed on Sep. 7, 2001, which is hereby incorporated by reference.

2. Description of the Related Art

A variety of devices or methods of generating random numbers by using random events detected in the natural world are conventionally proposed. As a device of such kind, a random number generator by using, for example, a radioactive decay of an atomic nucleus is available. However, since there is a problem being peculiar to such the device handling radioactive rays, in current popular use is a use of a random number generator using a thermal noise produced by a resistor, diode, or a like.

As an example of a device to generate random numbers using a thermal noise, a random number generator is disclosed in Japanese Patent Application Laid-open No. 2001-134422. FIG. 9 is a schematic block diagram showing configurations of a conventional thermal noise physical random number generator disclosed in Japanese Patent Application Laid-open No. 2001-134422. In the thermal noise physical random number generator 100, a thermal noise voltage generated from a thermal noise generating device 101 such as a resistor, diode, or a like is amplified by a preamplifier 102 and a main amplifier 103 and a crest value of an analog signal obtained by amplification is selected by a pulse height discriminator 104 according to a threshold value.

A waveform of a pulse thus selected is shaped by a waveform shaper 105 so as to become a rectangular wave signal and the waveform-shaped rectangular wave signal is transmitted to a time measuring device 106. The time measuring device 106 measures a time interval between pulses, based on a clock pulse generated by a time measuring pulse generator 107 and counts a number of pulses in a specified bit unit. A random number generator 108 takes out a counted number of bits as random numbers which are then stored in a random number storing device and controller 109.

When an amplifier being used in such the random number generator 108 as described above (for example, the above preamplifier 102, and the main amplifier 103) performs ideal amplification, if each instantaneous value of an input is independent from one another, an instantaneous value of its output is also independent. Therefore, when a pulse is produced by comparing the instantaneous value with a predetermined voltage, its pulse interval is provided in an ideal manner. If the predetermined voltage is sufficiently higher than a root mean square (rms) value of a voltage value obtained after the amplification, a probability of occurrence of a pulse to be produced by comparing with amplified thermal noise follows a Poisson distribution and the time interval between pulses follows exponential distribution. Then, when the time interval is measured by an N-bit counter, the counted values become uniform random numbers if occurrence frequency of a pulse, clock frequency of a counter, numbers of bits of the counter or a like can satisfy a specified condition.

However, in an actual amplifier or amplifying circuit, it is unavoidable that its response time is finite and its band is also finite. As a result, even if each instantaneous value of an input is independent, each instantaneous value of its output is not independent. Therefore, when a pulse is produced by comparing a voltage obtained after amplification with a specified voltage, since the comparison is made by a voltage value affected by its previous voltage value, the time interval between pulses does not follow exponential distribution and invalid pulses are mixed in addition to pulses following original exponential distribution.

FIG. 10A is a diagram showing a waveform of a signal obtained after amplification in the case where an amplifier provides an ideal behavior in which a crest of a voltage having a small amplitude occurs immediately after a crest of a voltage having a large amplitude. When a waveform of the signal having the crest of the voltage with the large amplitude is compared with the signal having the crest of the voltage with the small amplitude by using a threshold value 201 shown by a dashed line in FIG. 10A serving as a reference voltage, a pulse 202 is produced only by the crest of the voltage having the large amplitude as shown in FIG. 10B.

However, in an actual amplifier, if a previous voltage value is mixed in the voltage obtained after the amplification, as shown in FIG. 11A, a crest of the voltage occurring immediately after the crest of the voltage having the large amplitude becomes higher when compared with the case of an amplifier which provides an ideal behavior. Therefore, when the amplitudes of the signal having the two crests are compared by using the threshold value 205 shown by a dashed line serving as a reference value, though the crest of the voltage having a small amplitude is lower than the crest of the voltage having the large amplitude at a time of signal inputting, the former is involved in the generation of a pulse and, as shown in FIG. 11B, an invalid pulse 207 in addition to an originally desired pulse 206 is produced.

As described above, when random pulses are generated using the waveform of the signal shown in FIG. 11(a), since the invalid pulse 207 described above is mixed in with desired pulses 206 to be originally produced, uniformity of random numbers is disturbed. That is, in the conventional thermal noise physical random number generator 100, production of random numbers is affected by a response characteristic of the amplifiers 102 and 103 because the random numbers are produced by using pulses in which invalid pulses 207 are mixed. This presents a problem in that, since random numbers having small random number codes occur more than those having other random number codes, uniformity of output random numbers cannot be secured.

As a result, a secondary problem is produced in that a bias existing in the occurring random number codes causes a critical defect of a random number generator and such the random number generator, when being mounted on other devices requiring a true random number, cannot provide a desired result.

SUMMARY OF THE INVENTION

In view of the above, it is an object of the present invention to provide a random number generating method and its device which are capable of removing an influence on a characteristic of random numbers caused by a circuit response made at a time of amplifying a noise and of generating uniform random numbers.

Another object of the present invention is to provide a random number generating method and its device which are capable of generating random numbers based on a time interval between valid pulses out of random pulses obtained from a thermal noise source.

According to a first aspect of the present invention, there is provided a method for generating random numbers based on a thermal noise fed from a thermal noise generating source including:

a step of amplifying a voltage level of the thermal noise;

a step of producing random pulses by comparing a voltage level of the amplified thermal noise with a reference voltage level;

a step of measuring a time interval between the random pulses;

a step of excluding, if the time interval is within a predetermined time, the random pulses occurred within the predetermined time; and a step of generating, if the time interval exceeds the predetermined time, random numbers based on a time interval between pulses having the time interval exceeding the predetermined time.

In the foregoing, a preferable mode is one wherein measurement of the time interval is made based on count numbers provided by a counter which is driven in response to the random pulses and, if the count numbers are within a predetermined value, generated random pulses are excluded.

Also, a preferable mode is one wherein the predetermined time corresponds to count numbers obtained by one-cycle counting by the counter.

Also, a preferable mode is one that wherein includes a step of performing waveform shaping on the random pulses.

According to a second aspect of the present invention, there is provided a random number generating device to generate random numbers based on a thermal noise fed from a thermal noise generating source including:

an amplifier to amplify a voltage level of the thermal noise;

a random pulse generator to generate random pulses by comparing a voltage level of the amplified thermal noise with a reference voltage level;

a measuring device to measure a time interval between the random pulses;

a pulse controller to exclude, if the time interval is within a predetermined time, the random pulses occurred within the predetermined time and, if the time interval exceeds the predetermined time, to allow the random pulses to pass; and a random number generator to generate random numbers based on a time interval between random pulses that are allowed to pass.

In the foregoing, a preferable mode is one wherein the measuring device includes a counter which is driven by the random pulses and which makes measurement of the time interval based on count numbers provided by the counter and wherein the pulse controller excludes random pulses occurred when the count value is within a predetermined value.

Also, a preferable mode is one wherein the count numbers provided by the counter is configured so as to depend on a number of bits contained within the counter, and wherein measurement of the time intervals is configured so as to depend on an operating frequency of the counter.

Also, a preferable mode is one wherein the predetermined time corresponds to count numbers obtained by the counter counting one-cycle.

Also, a preferable mode is one that wherein includes a waveform shaper to perform waveform shaping on the random pulses.

According to a third aspect of the present invention, there is provided a program to have a computer perform processes of generating random pulses by comparing a voltage level of a thermal noise obtained by amplifying the thermal noise from a thermal noise generating source with a reference voltage level and of generating random numbers based on a time interval between random pulses including:

a process of measuring the time interval between random pulses:

a process of, if the time interval is within a predetermined time, excluding the random pulses occurred within the predetermined time; and a process of, if the time interval exceeds the predetermined time, generating random numbers based on the time interval exceeding the predetermined time.

With the above configuration, random pulses are generated by comparing a voltage level obtained by amplifying a voltage level of a thermal noise fed from a thermal noise generating source with a reference level. If a time interval between random pulses is within a predetermined time, random pulses occurring within the predetermined time are excluded. If the time interval between the random pulses exceeds the predetermined time, random numbers are generated based on a time interval between pulses that exceeds the predetermined time. That is, by excluding invalid pulses at a time interval being clearly shorter than the predetermined time, random numbers are generated at the time interval between valid pulses. Therefore, uniform random numbers can be generated by avoiding adverse influences on characteristics of random numbers to be generated.

Moreover, by making the predetermined time to exclude random pulses be corresponded to count values obtained by one count cycle of the counter used to measure a time interval between pulses, handling of the counter is made easy and control is exerted in a manner that a number of bits that the counter can provide is satisfied.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
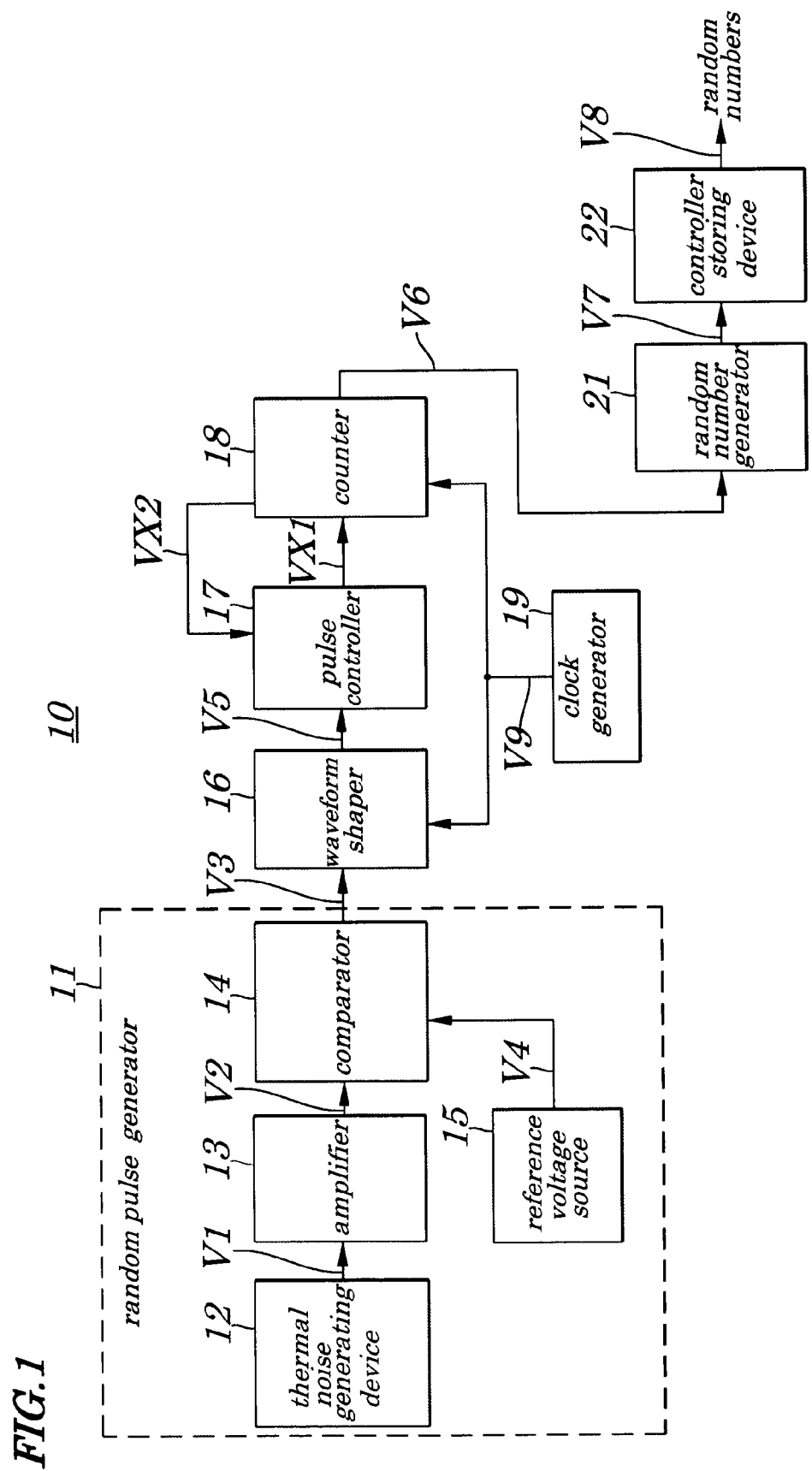
FIG. 1 is a schematic block diagram showing an entire configuration of a random number generator device according to an embodiment of the present invention.

FIG. 1 is a schematic block diagram showing an entire configuration of a random number generator device 10 according to an embodiment of the present invention. The random number generator device 10 shown in FIG. 1 generates random numbers by amplifying thermal noises in the natural world, by producing random pulses through comparison between voltage values of the thermal noises obtained after the amplification and specified voltages and then by measuring a time interval between the random pulses. At this point, by removing an influence on characteristics of random numbers caused by a circuit response made at a time of amplifying noises using a method described later, uniform random number is generated.

Next, concrete configurations of the random number generator device 10 of the embodiment and its operations are described below. As shown in FIG. 1, the random number generator device 10 of the embodiment has a random pulse generator 11 serving as a generation source of random pulses which is made up of a thermal noise generating device 12, an amplifier 13, a comparator 14, and a reference voltage source 15. The thermal noise generating device 12 is constructed of, for example, a conductor such as a resistor, or a semiconductor device such as a diode or a like. A thermal noise voltage V1 (voltage of the order of micro-volts), after having been amplified by the amplifier 13, is input to the comparator 14 as a noise voltage V2.

Though thermal noise being generated by the thermal noise generating device 12 is a random and non-periodical noise having a wide band (hereinafter called a "random noise" or a "white noise"), since a phenomenon of generation (that is, its generation mechanism) is well known, its description is omitted accordingly.

The comparator 14 compares the noise voltage V2 obtained after the amplification with a predetermined voltage V4 generated by the reference voltage source 15 to obtain a random pulse V3. That is, the comparator 14 produces the random pulse V3 by outputting a logical high-level signal if the noise voltage V2 exceeds the predetermined voltage serving as a threshold value 4 and by outputting a logical low-level signal if the noise voltage V2 is less than the threshold voltage 4. Moreover, a waveform shaper 16 emits the random pulse V3 using a clock signal V9 fed from the clock generator 19 and transforms a waveform of the random pulse V3 to become a rectangular waveform pulse signal V5. This enables operations of a counter 18 placed at a later stage to be made easy.

The rectangular waveform pulse signal V5 obtained by a waveform—shaping process in the waveform shaper 16 is transmitted through a pulse controller 17 to the counter 18. Then, the counter 18 measures a time interval between specified pulses of the rectangular waveform pulse signal V5. More particularly, the counter 18 operating in response to the clock signal V9 fed from the clock generator 19 starts counting on a rising edge of a pulse VX1 transmitted from the pulse controller 17 and judges whether or not the number of counts exceeds a predetermined value.

A signal indicating a result of the above judgment is transmitted as a control signal VX2 from the counter 18 to the pulse controller 17. The pulse controller 17, based on the control signal VX2, cuts off (that is, ignores or excludes) pulses generated within the specified time after the initiation of the counting by the counter 18 and transmits the pulse VX1 to the counter 18 only when a time interval between pulses exceeds a specified time. The counter 18 having received the pulse VX1 calculates the time interval between pulses passing through the pulse controller 17 as count values V6 and outputs it to a random number generator 21.

The random number generator 21 takes out a desired number of bits as random numbers from the above count values V6 and stores the number of bits as random numbers V7 in a controller/storing device 22. The controller and storing device 22, under control from a controlling section (not shown) (for example, a CPU (Central Processing Unit) made up of micro-processors), outputs random numbers VS (that is, natural random numbers or physical random numbers) to an outside of the random number generator device 10.

Moreover, the random number V7 is stored, for example, in accordance with a FIFO (First-in First-out) method, in the controller/storing device 22 in which newly generated random numbers sequentially expel random numbers generated and stored previously.

Figure 2:
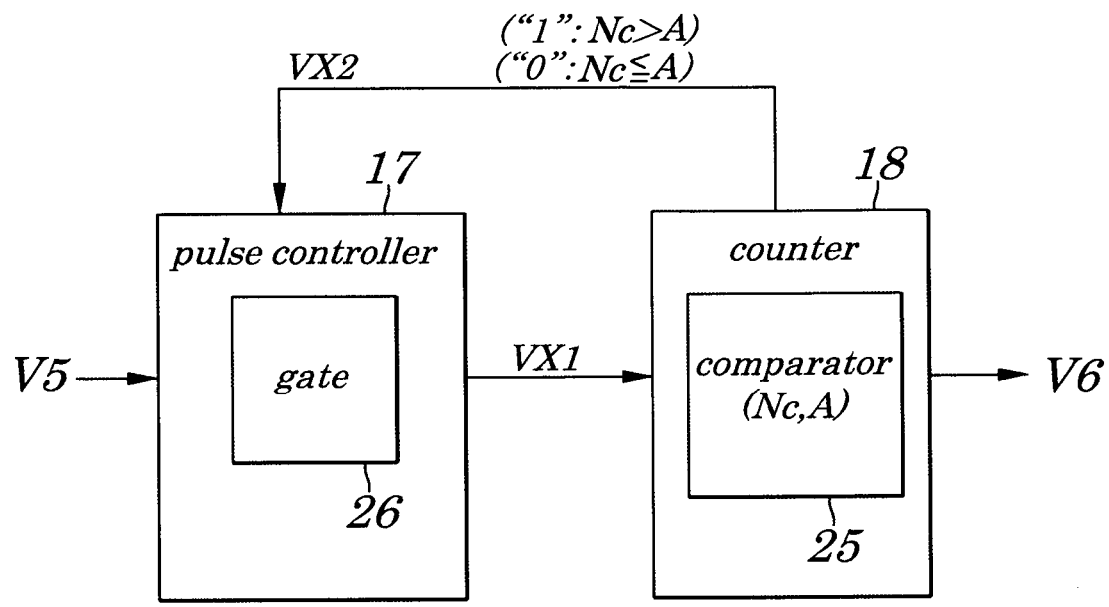
FIG. 2 is a schematic block diagram showing one example of internal configurations of a pulse controller and a counter in the random number generator device according to the embodiment of the present invention.

FIG. 2 is a schematic block diagram showing one example of internal configurations of the pulse controller 17 and the counter 18 in the random number generator device 10 of the embodiment of the present invention. As described above, the counter 18 judges whether or not the count number obtained by counting having started on a rising edge of the pulse VX1 exceeds a predetermined value. For this reason, the counter 18 internally has a comparator 25 and, when the comparator 25 judges that a count number Nc has exceeded a predetermined value A (Nc>A), outputs the control signal VX2 being a logical "1" from the counter 18 to the pulse controller 17. However, the counter 18, when judging that the count number Nc is less than the predetermined value A (Nc≦A), outputs a control signal VX2 being a logical "0".

The pulse controller 17 has a gate which performs an AND operation and, when the control signal VX2 is a logical "1", puts a gate 26 into an ON state and allows the rectangular waveform pulse signal V5 fed from the waveform shaper 16 to pass (that is, puts the rectangular waveform signal V5 in a through state) so that the pulse rectangular waveform signal V5 is transmitted as the pulse VX1 to the counter 18. On the other hand, the pulse controller 17, when the control signal VX2 is a logical "0", puts the gate 26 into an OFF state to inhibit transmission of the rectangular waveform pulse signal V5 from the pulse controller 17 to the counter 18. In other words, the pulse controller 17 allows a pulse to pass or inhibits the passage of the pulse using the control signal VX2 as a flag.

Next, a method will be explained for removing an influence on characteristics of random numbers caused by a circuit response made at a time of the amplification, thereby producing uniform random numbers, which is employed in the random number generator device 10 of the embodiment and its principle. As described above, in the case of an actual amplifier (for example, the amplifier 13 in FIG. 1) which does not provide an ideal behavior and when a previous voltage value is mixed in the voltage obtained after the amplification, the production of a pulse based on a crest in a waveform of a signal having a large voltage is delayed when compared with the case of the amplifier which provides an ideal behavior, however, errors in times are random and do not have any influence on a time interval between pulses originally produced. However, as described above, an invalid pulse that should not occur originally affects random numbers that are to be generated.

Figure 3A:
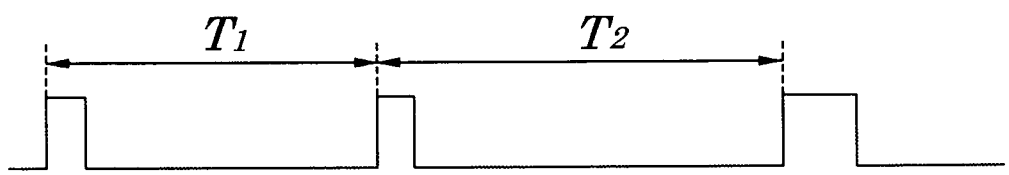
FIGS. 3A and 3B are schematic diagrams showing differences in pulses generated by a waveform shaper in the case of an amplifier that provides an ideal behavior and in the case of an actual amplifier which does not provide an ideal behavior according to the embodiment.
Figure 3B:
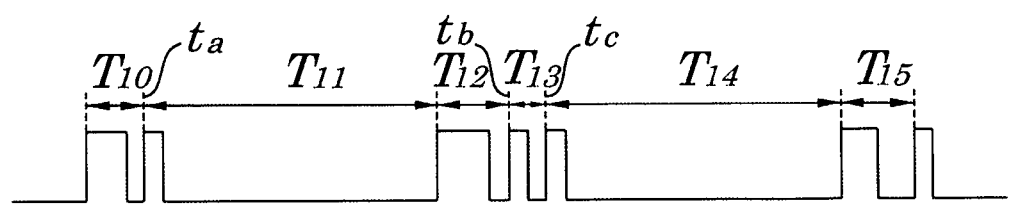

FIGS. 3A and 3B are schematic diagrams showing differences in pulses (rectangular wave pulse signal V5) generated by the waveform shaper 16 in the case of an amplifier that provides an ideal behavior and in the case of an actual amplifier which does not provide an ideal behavior according to the embodiment. FIG. 3A shows a pulse generated by the amplifier which provides an ideal behavior and FIG. 3B shows a pulse generated based on a signal obtained after amplification by the actual amplifier. That is, pulse intervals $T_1$ and $T_2$ shown in FIG. 3A are time intervals among valid pulses to be originally measured, however, $T_{10}$, $T_{12}$, $T_{13}$, and $T_{15}$ (FIG. 3B) are time intervals among invalid pulses which are obviously shorter than those among valid pulses specify.

Therefore, when random numbers are to be generated based on pulses having time intervals being shorter than those among valid pulses (specify), abnormally many codes having small values to be used as random numbers codes occur. As a result, in the pulse measurement to be made by the counter 18, unnecessary time intervals ($T_{10}$, $T_{12}$, $T_{13}$, $T_{15}$, or a like) among pulses which should not be originally counted are counted. To solve this problem, in the random number generator device 10 of the present invention, invalid pulses specify that follow valid pulses specify and have time intervals being obviously shorter than predetermined time intervals are excluded so that random numbers are generated using only valid pulses specify.

Moreover, in FIGS. 3A and 3B, each of time intervals among pulses is measured on the rising edge of each pulse, however, each of the time intervals among pulses may be measured on the falling edge of each pulse which can provide a same result.

Generally, when a time interval between random pulses having a probability of occurrence which follows Poisson distribution is measured and random numbers are generated using results of the measurement, if the probability of occurrence of the random pulses is high, frequency distribution of random numbers is biased. A ratio of frequency of occurrence of a minimum random number code to that of a maximum random number is given by a following expression:

$$\exp\left(-\lambda \frac{2^N}{f}\right) \quad \text{Expression (1)}$$

where "N" (bit) denotes a number of bits that the counter 18 can handle, "f" [Hz] denotes an operation frequency of the counter 18, "λ" [CPS] denotes frequency of occurrence of random pulses.

Figure 10A:
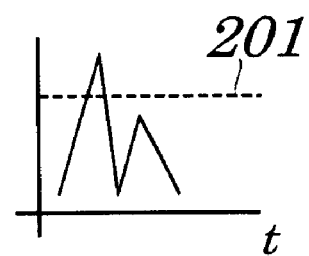
FIGS. 10A and 10B are diagrams showing waveforms of an amplified signal and of a generated pulse obtained when a conventional amplifier provides an ideal behavior.
Figure 10B:
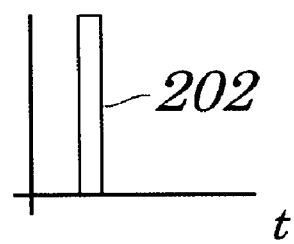
Figure 11A:
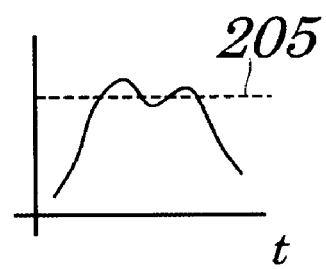
FIGS. 11A and 11B are diagrams showing waveforms of amplified signals and produced pulses by the conventional amplifier provides an actual behavior.
Figure 11B:
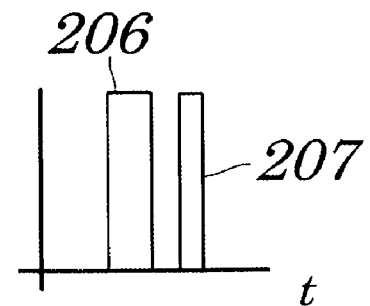

Moreover, the frequency of occurrence of random pulses is adjusted in accordance with a level of a threshold voltage (for example, the threshold values of the dashed lines indicating a threshold value 201 and a threshold value 205 shown in FIGS. 10 and 11).

In order for random numbers to be generated to be uniform, it is essentially required that the ratio represented by the above expression is close to "1" as much as possible. For example, it the number of bits "N" that the counter 18 can handle is 8, the operation frequency "f" is 16 [MHz], and the frequency of occurrence "λ" of random pulses is 2000 [CPS], the ratio becomes 0. 97. Therefore, to keep the ratio approximately at "1", the frequency of occurrence "λ" cannot be made large. This suggests that it is better to set a threshold value (for example, a predetermined voltage V4 shown in FIG. 1) used to produce a pulse to be as high as possible.

Therefore, an average time interval between pulses, when measured in a unit of an operation clock where of the counter 18, becomes considerably large. In the above embodiment, since the frequency of occurrence "λ" is 2000 [CPS], an average pulse interval is a time being equivalent to 8000 clocks on average. Since the invalid pulse, unlike in the case of the valid pulse, occurs at a time interval being obviously shorter than the predetermined time as described above, by removing the invalid pulse, random numbers can be generated by using only the valid pulse. Thus, the random number generator device 10 having the counter 18 (FIG. 1) which can handle 8 bits according to the embodiment, when a subsequently coming pulse is detected during a period of time between detection of a pulse and completion of one count cycle by the counter 18, operates to disregard the detected pulse.

More particularly, since the 8-bit counter 18 performs one-cycle of counting by 256 clocks, all pulses having reached within 256 clocks are excluded. In the embodiment, since each of the valid pulses has a time interval being equivalent to, on average, 8000 clocks, even if pulses having reached within 256 clocks are excluded, the probability of removing the valid pulses is very low.

The counter 18 shown in FIG. 1 performs counting operations in response to the clock signal V9 of 16 [MHz] produced by the clock generator 19. The counter 18 starts counting on the rising edge of the pulse VX1 fed from the pulse controller 17 and judges whether or not its count value exceeds a predetermined value (being equivalent to 256 clocks). Since a signal indicating a result of the judgment is transferred as the control signal VX2 having a predetermined logical state corresponding to its result from the counter 18 to the pulse controller 17, the pulse controller 17 having the gate function (ON/OFF of the gate) described above excludes a pulse having been input within a time during which the value obtained by the counter 18 does not exceed the predetermined value.

Moreover, the pulse controller 17, when the counter 18 recognizes that specified time or more has passed since the counter 18 had started counting of the pulse, based on a logical state of the control signal VX2, transmits the pulse VX1 to the counter 18. As a result, since random numbers are not produced by pulses occurred within a determined time and produced only by pulses (valid pulses) each having a pulse interval being the specified time or more, uniform random numbers are output by the random number generator 21.

Figure 4:
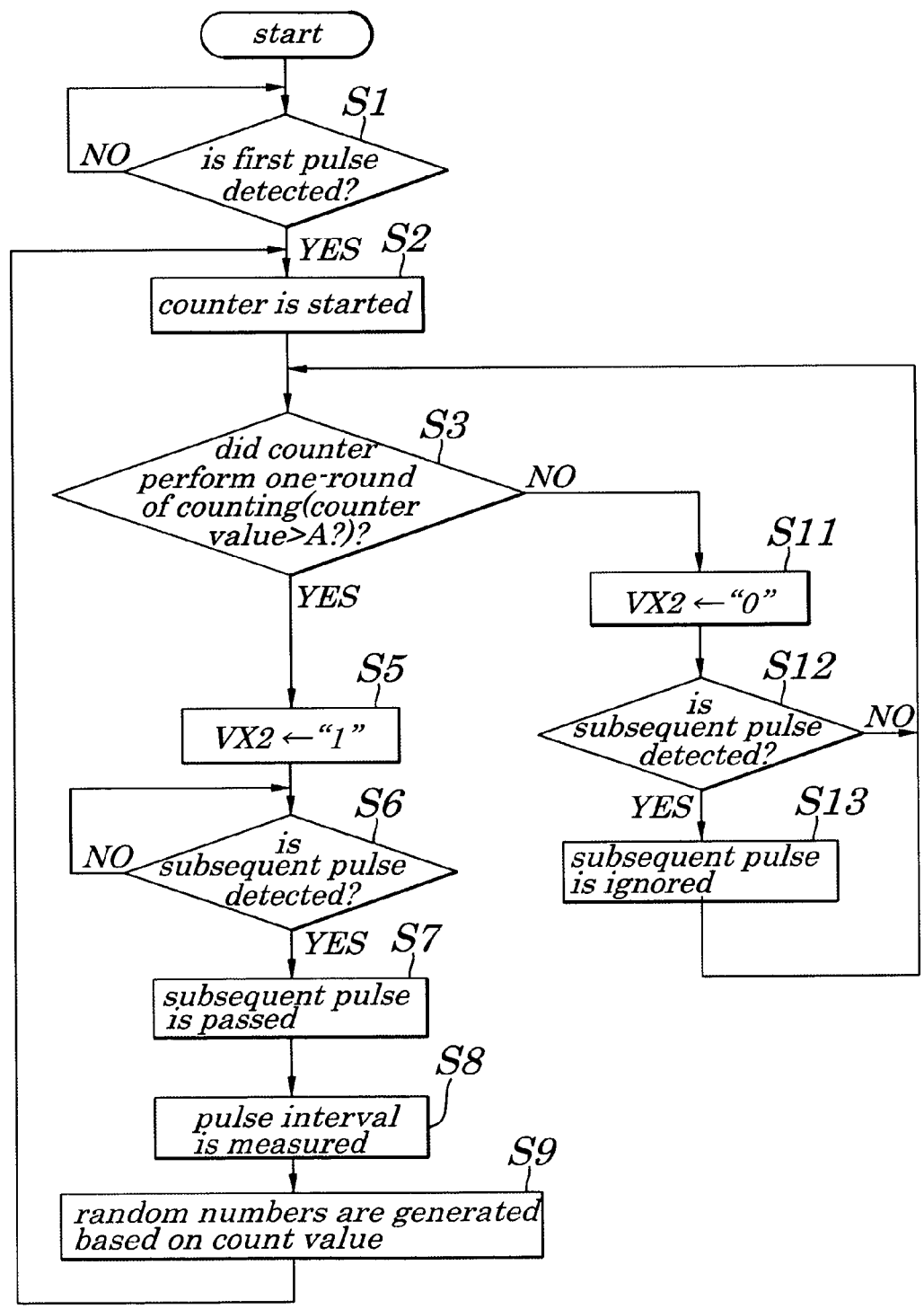
FIG. 4 is a flowchart explaining steps of operating the random number generator device according to the embodiment of the present invention.

FIG. 4 is a flowchart explaining steps of operating the random number generator, in particular, of controlling the pulse generator 17 and the counter 18 of the embodiment of the present invention. At Step S1 in FIG. 4, whether or not a first pulse has arrived is judged. If an arrival of the pulse is detected at this Step S1, counting operations are started by the counter 18 at its subsequent Step S2. Whether or not the counter 18 has performed one-cycle counting is checked at Step S3. That is, at Step S3, a count value of the counter 18 is compared with a predetermined value A. If the count value exceeds the predetermined value A, the counter 18 judges that it has performed one-cycle counting. The "one-cycle counting" represents, as described above, that, in the case where the 8-bit counter 18 is used, counts being equivalent to 256 clocks are obtained.

If it is judged that one-cycle counting has been performed at Step S4, a control signal VX2 being a logical "1" is output at subsequent Step S5 from the counter 18 to the pulse controller 17. At subsequent Step S6, a pulse arriving subsequent to a pulse (hereafter called the "subsequent pulse") detected at Step S1 is detected.

If the subsequent pulse is detected at Step S6, since a logical state of the control signal VX2 at that time is "1", it means that a time interval between the first pulse and the subsequent pulse exceeds the predetermined time. Then, at Step S7, the pulse controller 17 allows the "subsequent pulse" to pass and to go to the counter 18.

Moreover, since the pulse detected at Step S1 is the first pulse, it is unconditionally transmitted from the pulse controller 17 to the counter 18.

The counter 18, when having received the above subsequent pulse, measures a time interval between a previous pulse and a subsequent pulse. Since a signal indicating a result of the measurement is output from the counter 18 as a count value V6, random numbers are generated by the random number generator 21 based on the count value V6 at Step S6. After the random numbers have been generated at Step S9, the routine again returns to Step S2 to start (re-start),the operation of the counter 18.

On the other hand, when the counter 18 does not perform the one-cycle counting (when judged to be "NO" at Step S3), the control signal VX2 being a logical "0" is output from the counter 18 to the pulse controller 17. Then, whether or not a pulse being subsequent to the pulse detected at the above Step S1 (that is, the subsequent pulse) exists is judged at a subsequent Step S12. At this point, if no subsequent pulse is detected, the routine returns to Step S3 to again check to see whether or not the counter 18 has performed one-cycle counting.

In contrast, if the subsequent pulse is detected at Step S12, since the detected pulse has occurred within a time during which a count value obtained by the counter 18 does not exceed a predetermined value (that is, the count value$\leqq$ predetermined value A and the counter 18 has not yet performed one-cycle counting), the pulse controller 17 ignores (excludes) the pulse at Step S13. Thus, by performing a step of ignoring a "subsequent pulse", the generation of random numbers by a pulse which has occurred after a lapse of a predetermined time following the occurrence of a previous pulse can be avoided.

The routine is returned to Step S3 after the completion of the above Step S13 to check to see whether or not the counter 18 has performed one-cycle counting. Based on a result of the judgment, same processing as described above is performed.

Figure 5:
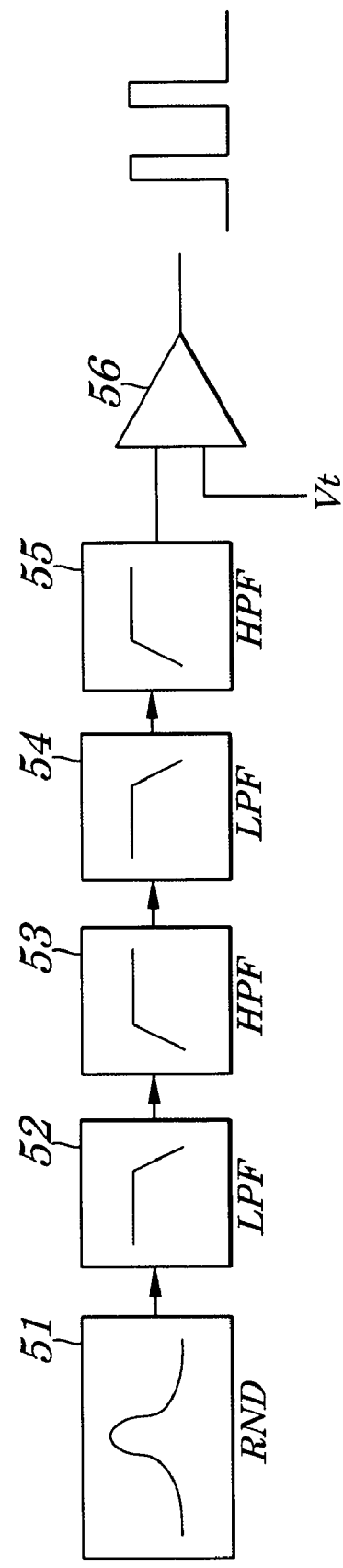
FIG. 5 is a diagram showing configurations of a circuit used for simulation in a C language according to the embodiment of the present invention.

Next, simulation is explained which is performed to check whether or not an algorithm for generating random numbers of the present invention can achieve an expected effect. FIG. 5 shows circuit configurations used for simulation in C language. A component RND 51, by adding random number values obtained from a random number function (uniform random number function), produces random number values which provide a normal distribution, thereby generating random numbers being similar to a thermal noise.

Here, a comparison is made in between a case where random numbers are allowed to pass through low-pass filters (LPF) 52 and 54 and high-pass filters (HPF) 53 and 55 and a case where a pulse is produced straight using generated random numbers. Moreover, the random number value used here is 16 Mega—Sample/second and a cut-off frequency of the digital filter is 3 KHz for the LPF and is 120 KHz for the HPF. Also, for simplicity, a Butterworth filter is used as a digital filter. Then, an adjustment of a threshold value Vt being used in the amplifier 56 is made so that the occurrence frequency of a pulse is about 2000 [CPS].

Figure 6:
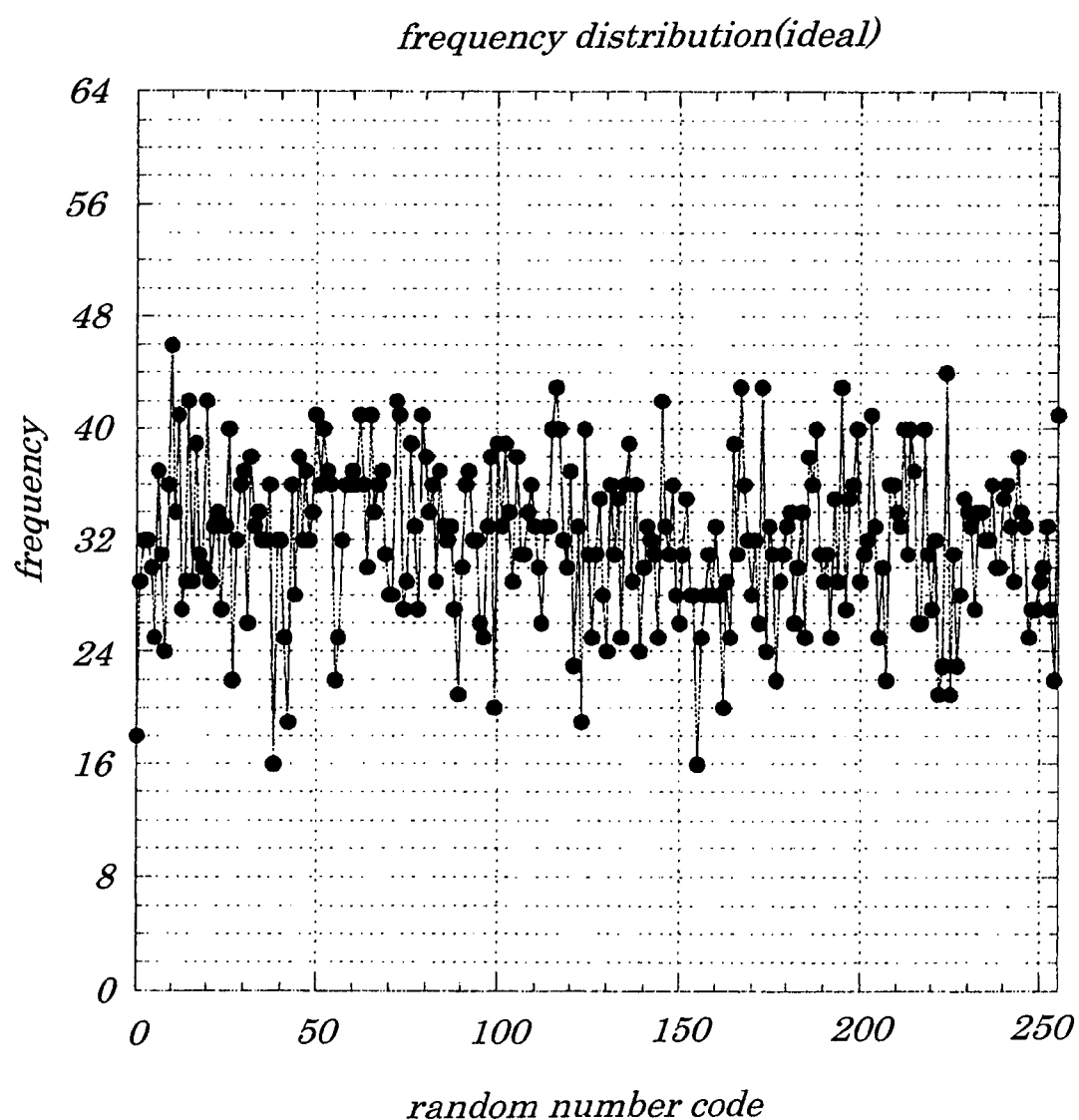
FIG. 6 is a graph showing a result from simulation performed in an ideal state according to the embodiment of the present invention.
Figure 7:
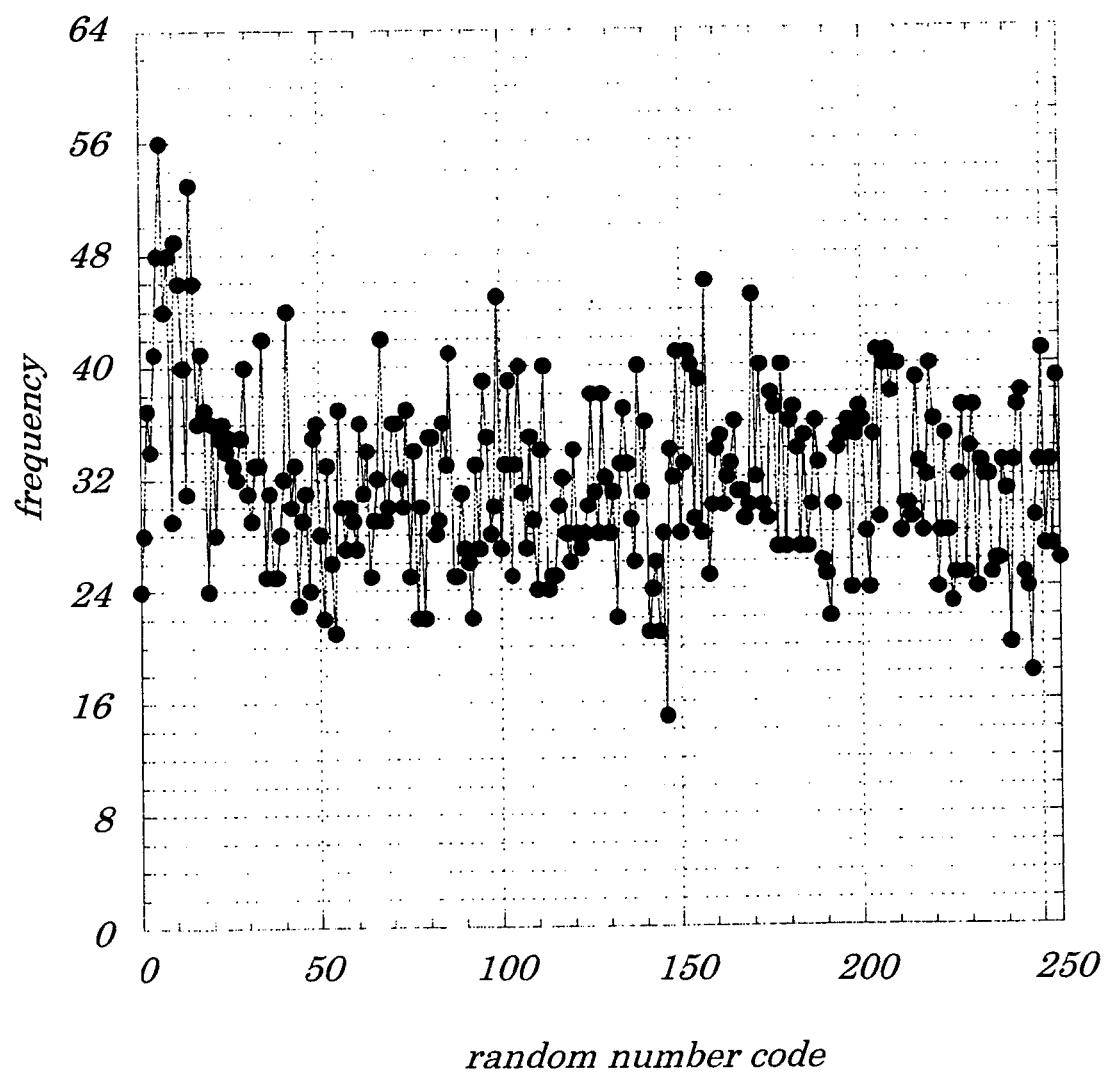
FIG. 7 is a graph showing a result from simulation performed while a filter is used according to the embodiment of the present invention.
Figure 8:
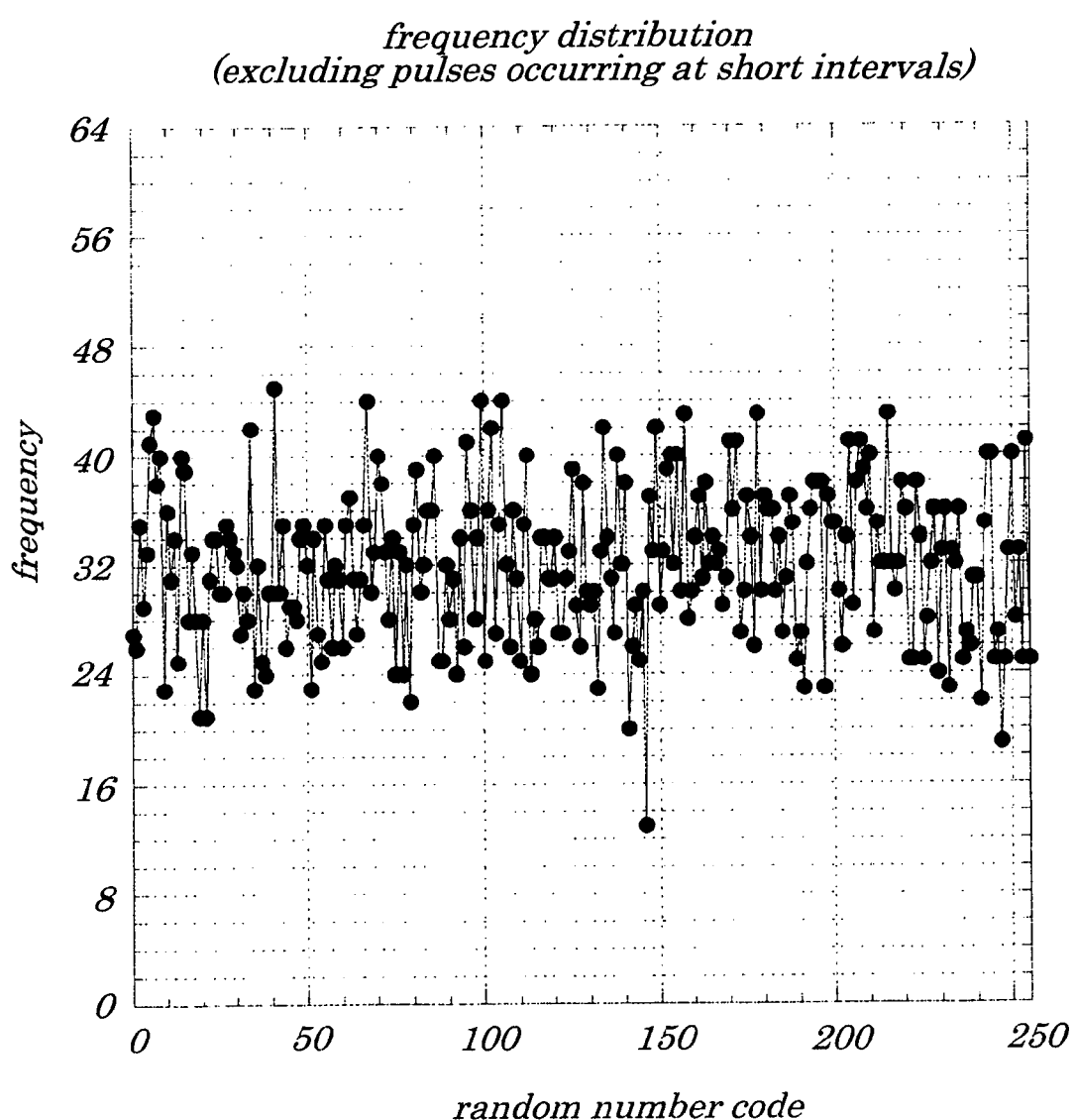
FIG. 8 is a graph showing a result from simulation performed when pulses occurring at a short time interval are excluded according to the embodiment of the present invention.
Figure 9:
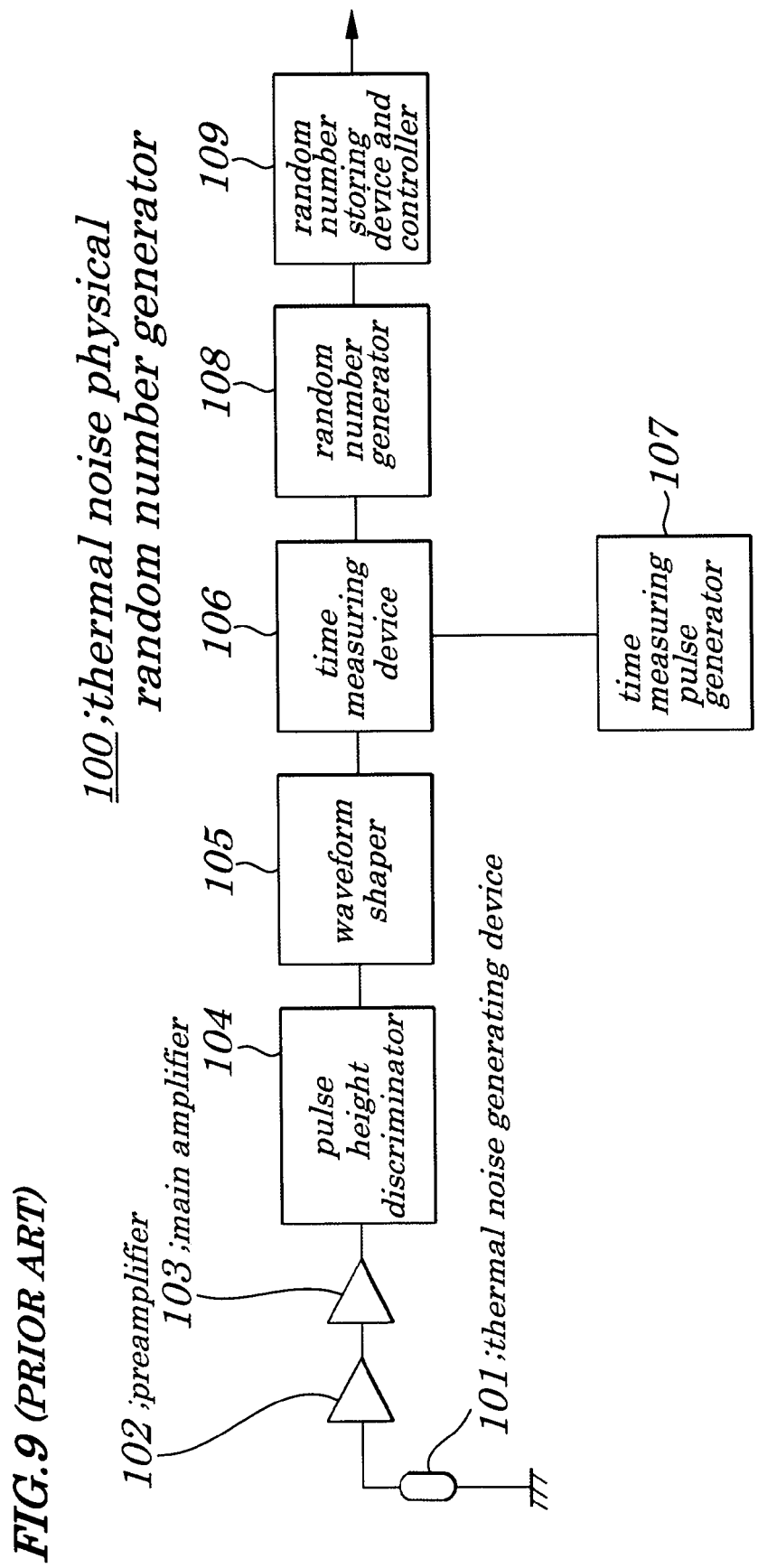
FIG. 9 is a schematic block diagram showing configurations of a conventional thermal noise physical random number generator.

FIGS. 6 to 8 are graphs obtained by graphing results of simulation, that is, showing frequency distribution. The random number code is plotted as abscissa and the frequency of occurrence as ordinate. Now, let it be assumed that, in the simulation circuit in FIG. 5, the simulation is performed without use of the filter in a state where an amplifier 56 works ideally, a result shown in FIG. 6 can be obtained. In FIG. 6, since the random number values used in the frequency distribution are 8192 pieces and its random number code is 8 bits, the frequency is fluctuated relative to an expected value 32.

In contrast, when random numbers are generated based on pulses obtained through the filters shown in FIG. 5, as shown in FIG. 7, it is clear that the frequency is fluctuated sharply in small portions of the random number codes (within a range between random number codes 0 to 50) which is deviated from uniform distribution. Thus, when pulses having a small time interval being within 256 clocks obtained by one-cycle counting of the counter 18 are excluded, unlike in the case shown in FIG. 7, the frequency becomes normal in small portions of the random number codes, as shown in FIG. 8, that is, uniform distribution can be provided. This means that, by using the algorithm for generating random numbers of the present invention, uniform random numbers can be obtained.

Moreover, the random number generator 21 of the embodiment of the present invention can be applied to devices requiring more uniform random numbers such as encryption devices, IC cards, game machines or playing machines in which victory or defeat is influenced by the probability, authentication devices, or a like.

Thus, according to the embodiment of the present invention, by configuring the random number generator 21 so that, if count values of the counter exceed a predetermined value after a first pulse has been detected, it is interpreted that the counter 18 has completed one-cycle counting, thus causing a pulse arriving next to be passed on to the counter 18 and then causing random numbers based on a time interval between pulses to be generated, however, if the count values of the counter 18 are less than the predetermined value, transmission of a pulse signal to the counter 18 is inhibited, thus preventing the pulse from participating in the generation of random numbers, random numbers are not generated by a subsequent pulse occurred within specified time following detection of the pulse. Therefore, it is possible to prevent an invalid pulse that should not occur originally from adversely affecting random numbers to be generated.

That is, by configuring the random number generator 21 so that an invalid pulse occurring by a circuit response at a time of amplification is ignored, an adverse influence on characteristics of generated random numbers caused by such invalid pulses can be removed and therefore random numbers are generated based on a time interval between valid pulses out of random pulses, which enables generation of uniform random numbers (natural random numbers or physical random numbers) having no bias in an occurrence rate.

It is apparent that the present invention is not limited to the above embodiments but may be changed and modified without departing from the scope and spirit of the invention. For example, in the process of generating random numbers shown in FIG. 4 in the above embodiment, after a detected subsequent pulse has been ignored at Step S13, the routine returns to Step 3 to again check to see whether or not the counter 18 has completed its one-cycle counting, however, the routine may return to Step 3 after resetting the counter 18 which performs one-cycle counting after having ignored such invalid pulses.

Also, in the process of generating random numbers in the above embodiment, counting is started on a rising edge of a valid pulse, counting operations of the counter 18 continues until originally normal subsequent pulse is detected even if an invalid pulse is detected, however, the present invention is not limited to the operations and following processes may be employed. That is, as shown in FIG. 3B, after arrival of a valid pulse, at times $t_a$, $t_b$, $t_c$ or a like, resetting may be made to the counter 18 whenever an invalid pulse is detected.

In this case, the intervals $T_{11}$ and $T_{14}$ shown in FIG. 3B represent a time interval between pulses which are used for the generation of random numbers. However, even if such counting processes are employed, as described above, since the time interval between valid pulses and the short time interval between invalid pulses are provided, there is no influence on uniformity of random numbers to be generated.

Also, in the above embodiment, the random number generator device 10 is so configured that the pulse controller 17 to control passage and blocking of a pulse and the counter 18 to measure a time interval between pulses are independently and separately provided, however, it may be so configured that the pulse controller 17 is embedded in the counter 18 and the counter 18 itself has a function of controlling the pulse.

Moreover, the random number generator of the embodiment may be so configured that, by using a CPU (Central Processing Unit) (not shown) that can control entire operations of the random number generator, the reference voltage source 15 and the clock generator 19 are controlled, thereby making variable the predetermined voltage V4 generated by the reference voltage source 15 or a clock signal V9 fed from the clock generator 19 whenever necessary.

Furthermore, in the random number generator of the embodiment, operations existing after operations of the waveform shaper 16 shown in FIG. 1 can be software-controlled partially or totally. That is, passage or blocking of pulses, measurement of the time intervals between pulses, taking-out of random numbers or a like that are hardware-controlled also may be software-controlled, which can provide random numbers having high uniformity.

It is apparent that the present invention is not limited to the above embodiments but may be changed and modified without departing from the scope and spirit of the invention.

What is claimed is:

1. A method for generating random numbers based on a thermal noise fed from a thermal noise generating source comprising:
   a step of amplifying a voltage level of said thermal noise;
   a step of producing random pulses by comparing a voltage level of the amplified thermal noise with a reference voltage level;
   a step of measuring a time interval between said random pulses;
   a step of excluding, if said time interval is within a predetermined time, said random pulses occurred within said predetermined time; and
   a step of generating, if said time interval exceeds said predetermined time, random numbers based on a time interval between pulses having said time interval exceeding said predetermined time.

2. The method for generating random numbers according to claim 1, wherein measurement of said time interval is made based on count numbers provided by a counter which is driven in response to said random pulses and, if said count numbers are within a predetermined value, generated random pulses are excluded.

3. The method for generating random numbers according to claim 2, wherein said predetermined time corresponds to count numbers obtained by said counter counting one cycle.

4. The method for generating random numbers according to claim 1, further comprising a step of performing waveform shaping on said random pulses.

5. A random number generating device to generate random numbers based on a thermal noise fed from a thermal noise generating source comprising:
   an amplifying means to amplify a voltage level of said thermal noise;
   a random pulse producing means to produce random pulses by comparing a voltage level of the amplified thermal noise with a reference voltage level;
   a measuring means to measure a time interval between said random pulses;
   a pulse controlling means to exclude, if said time interval is within a predetermined time, said random pulses occurred within said predetermined time and, if said time interval exceeds said predetermined time, to allow said random pulses to pass; and
   a random number generating means to generate random numbers based on a time interval between random pulses that are allowed to pass.

6. The random number generating device according to claim 5, wherein said measuring means comprises a counter which is driven by said random pulses and which makes measurement of said time interval based on count numbers provided by said counter and wherein said pulse controlling means excludes random pulses occurred when said count value is within a predetermined value.

7. The random number generating device according to claim 6, wherein said count numbers provided by said counter is configured so as to depend on a number of bits contained within said counter, and wherein measurement of said time intervals is configured so as to depend on an operating frequency of said counter.

8. The random number generating device according to claim 7, wherein said predetermined time corresponds to count numbers obtained by one-cycle counting by said counter.

9. The random number generating device according to claim 5, further comprising a waveform shaping means to perform waveform shaping on said random pulses.

10. A random number generating device to generate random numbers based on a thermal noise fed from a thermal noise generating source comprising:
an amplifier to amplify a voltage level of said thermal noise;
a random pulse generator to generate random pulses by comparing a voltage level of the amplified thermal noise with a reference voltage level;
a measuring device to measure a time interval between said random pulses;
a pulse controller to exclude, if said time interval is within a predetermined time, said random pulses occurred within said predetermined time and, if said time interval exceeds said predetermined time, to allow said random pulses to pass; and
a random number generator to generate random numbers based on a time interval between random pulses that are allowed to pass.

11. The random number generating device according to claim 10, wherein said measuring device comprises a counter which is driven by said random pulses and which makes measurement of said time interval based on count numbers provided by said counter and wherein said pulse controller excludes random pulses occurred when said count value is within a predetermined value.

12. The random number generating device according to claim 11, wherein said count numbers provided by said counter is configured so as to depend on a number of bits contained within said counter, and wherein measurement of said time intervals is configured so as to depend on an operating frequency of said counter.

13. The random number generating device according to claim 12, wherein said predetermined time corresponds to count numbers obtained by one-cycle counting by said counter.

14. The random number generating device according to claim 10, further comprising a waveform shaper to perform waveform shaping on said random pulses.

15. A computer program product including computer-readable media, the media comprising instructions to have a computer perform processes of generating random pulses by comparing a voltage level of a thermal noise obtained by amplifying said thermal noise from a thermal noise generating source with a reference voltage level and of generating random numbers based on a time interval between random pulses comprising:
a process of measuring said time interval between random pulses:
a process of, if said time interval is within a predetermined time, excluding said random pulses occurred within said predetermined time; and
a process of, if said time interval exceeds said predetermined time, generating random numbers based on said time interval exceeding said predetermined time.

* * * * *